United States Patent [19]
Middleton

[11] Patent Number: 5,344,206
[45] Date of Patent: Sep. 6, 1994

[54] AUTOMOBILE SHADES

[76] Inventor: Roy J. Middleton, 15730 Walnut Creek, San Antonio, Tex. 78247

[21] Appl. No.: 124,597

[22] Filed: Sep. 22, 1993

[51] Int. Cl.$^5$ .................................................. B60J 3/02
[52] U.S. Cl. ................................. 296/97.8; 296/97.7; 296/97.4; 160/370.2 A; 160/271
[58] Field of Search .................... 296/97.4, 97.7, 97.8, 296/97.9, 97.11; 160/370.2 A, 270, 271, 241, 120, 23.1

[56] References Cited
U.S. PATENT DOCUMENTS

| | | | |
|---|---|---|---|
| 4,736,980 | 4/1988 | Eubanks | 296/97.7 X |
| 4,921,299 | 5/1990 | Herrick | 296/97.8 |
| 5,024,479 | 6/1991 | Bryngelson | 296/97.7 |

FOREIGN PATENT DOCUMENTS 244277 12/1925 United Kingdom ............... 296/97.7

*Primary Examiner*—Joseph D. Pape
*Attorney, Agent, or Firm*—Hugh E. Smith

[57] ABSTRACT

The present invention relates to automobile shades for the interior windshield of an automobile. The shade includes a rectangular frame in which a sheet of material rides. The frame is adapted for securement to the interior windshield of an automobile. One side of the frame is a supply housing while the other side is a take-up housing. An electric power source and a two way switch are employed to deploy and retract the sheet of material.

7 Claims, 4 Drawing Sheets

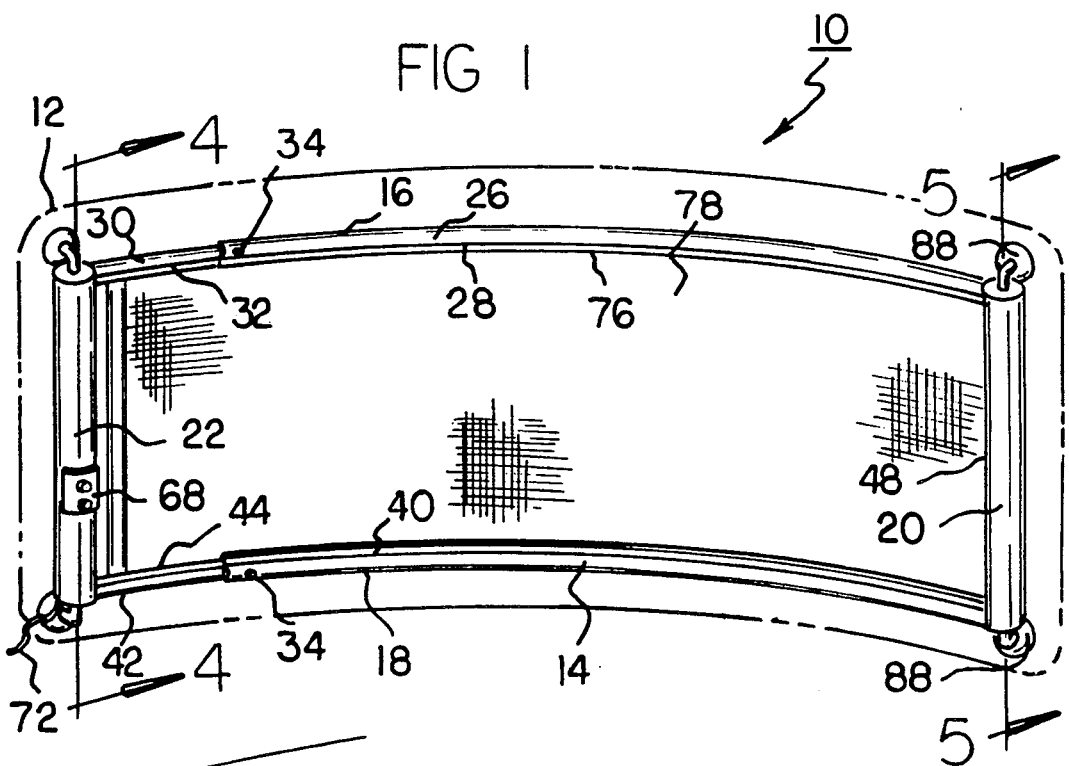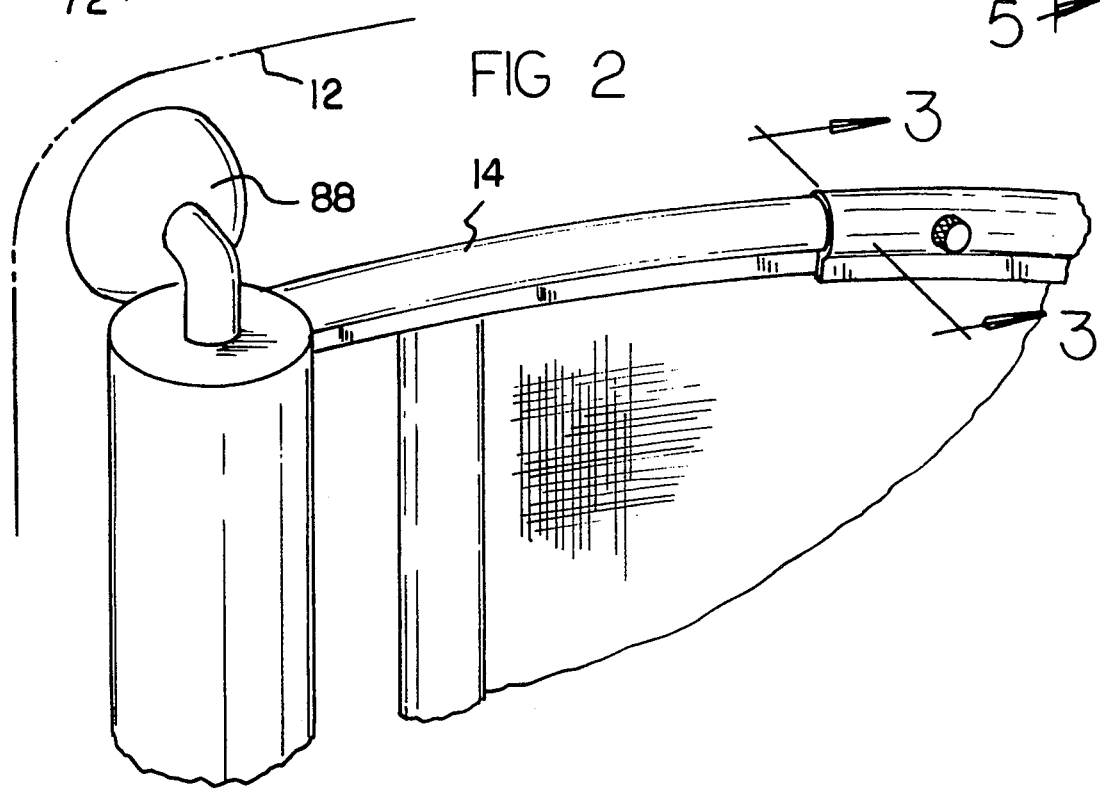

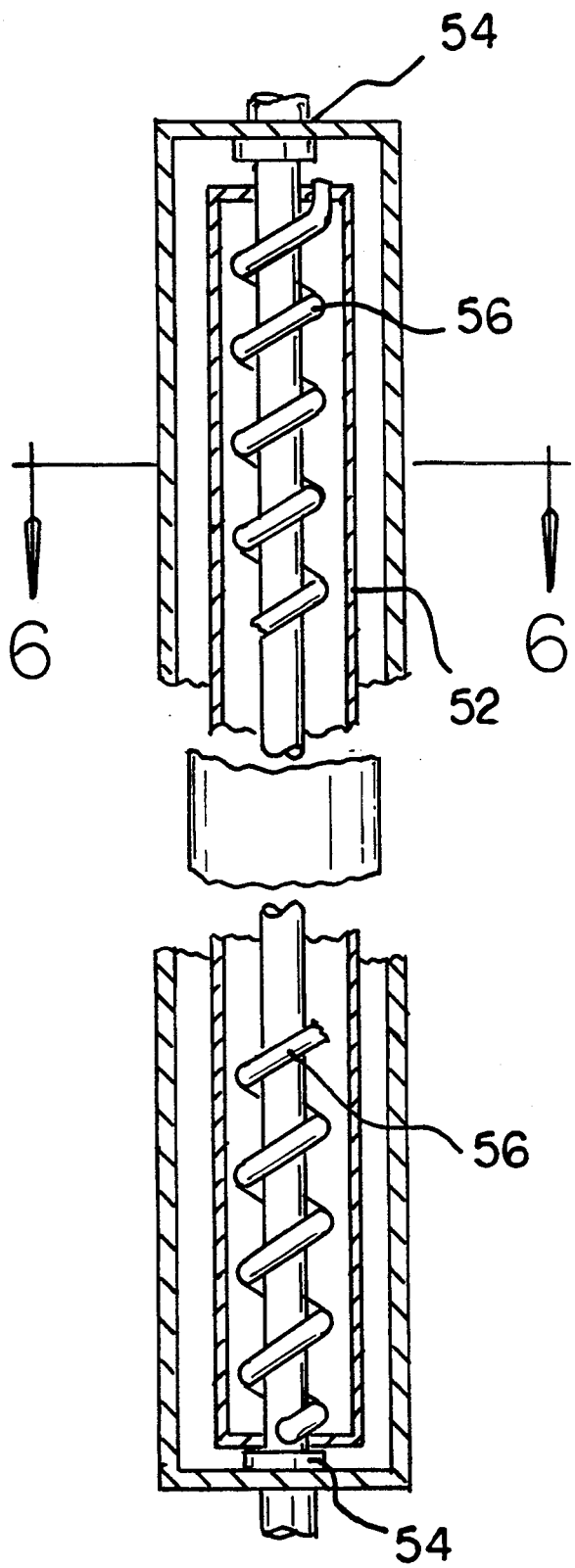
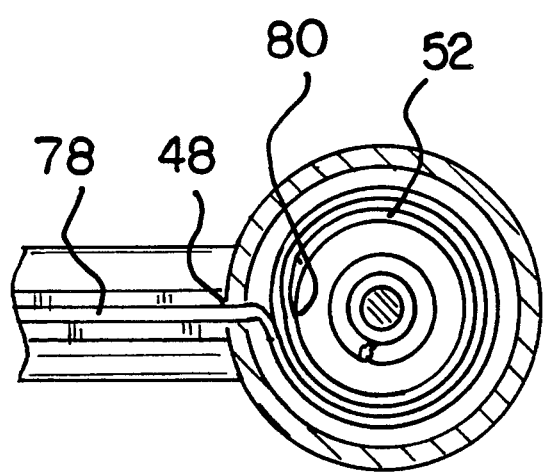
FIG 5
FIG 6

AUTOMOBILE SHADES

BACKGROUND OF THE INVENTION

1. Field of the Invention

The present invention relates to automobile shades and more particularly pertains to a retractable sun deflector shade adapted to be secured to the interior of an automotive windshield.

2. Description of the Prior Art

The use of automotive sun shades is known in the prior art. More specifically, automotive sun shades which are retractable are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,064,238 discloses a windshield sunshade assembly. The assembly includes a shade member that can be retracted or extended in order to cover the windshield from the inside of the vehicle.

Another patent of interest is U.S. Pat. No. 5,024,479 which discloses an automotive sun screen assembly. The assembly includes a flexible sheet normally rolled up into a helical configuration on a roller located within a tubular housing. The flexible sheet can be unwound from the roller to extend along the windshield.

A U.S. Design Patent of interest is U.S. Pat. No. 309,885. The patent illustrates a design for a windshield sun shade.

U.S. Pat. No. 5,044,687 discloses a sun vision which rotates and slides and is capable of covering the top horizontal and slanted parts of a front windshield.

Also of interest is U.S. Pat. No. 5,000,506 which discloses a sun shade for automobiles which can be actuated by electric motors.

While these shades fulfill their respective, particular objectives and requirements, the aforementioned patents do not describe an automotive sun shade assembly which includes a supply housing and a take-up housing. Additionally, the prior art shades do not illustrate a shade assembly wherein the shade is rolled up into a housing to the right or left of the driver. Furthermore, the prior art shade assemblies do not illustrate a shade assembly which includes a rectangular frame element.

In this respect, the automotive deflector shade according to the present invention substantially departs from the conventional concepts and designs of the prior art, and in so doing provides an apparatus primarily developed for the purpose of shading the interior portion of an automobile.

Therefore it can be appreciated that exists a continuing need for new and improved shades which can be used to shield the interior of an automobile from the suns rays.

SUMMARY OF THE INVENTION

In view of the foregoing disadvantages inherent in the known types of automobile shades and screens now present in the prior art, the present invention provides an improved automobile shade construction wherein the same can be used on the interior of an automobile windshield. As such, the general purpose of the present invention, which will be described subsequently in greater detail, is to provide a new and improved automobile shade apparatus and method which has all the advantages of the prior art shades and shields and none of the disadvantages.

To attain this, the present invention essentially comprises a retractable sun deflector shade adapted to be secured to the interior of an automotive windshield, the shade comprising a first upper C-shaped frame element having a forward end, a rearward end, an upper closed portion, and a lower open portion and a second upper C-shaped frame element having a forward end, a rearward end, an upper closed portion, and a lower open portion, the forward end of the second upper frame element being telescopically received within the rearward end of the first upper frame element with an upper thumb screw positioned within the rearward end of the first upper frame element, the upper thumb screw serving to selectively allow and prevent telescopic movement between the first and second upper frame elements; a first lower C-shaped frame element having a forward end, a rearward end, an upper open portion, and a lower closed portion and a second lower C-shaped frame element having a forward end, a rearward end, an upper open portion, and a lower closed portion, the forward end of the second lower frame element being telescopically received within the rearward end of the first lower frame element with a lower thumb screw positioned within the rearward end of the first lower frame element, the lower thumb screw serving to selectively allow and prevent telescopic movement between the first and second lower frame elements; a cylindrical supply housing having an upper extent, a lower extent, and a longitudinal slit extending from the upper extent to the lower extent, the supply housing being coupled to the first upper and lower frame elements such that the lower open portions of the first and second upper frame elements and the upper open portions of the first and second lower frame elements are in communication with the longitudinal slit of the supply housing; a cylindrical roll rotatively received within the supply housing with spring means operatively coupled to the cylindrical roll, the spring means serving to rotate the cylindrical roll to a first angular position; a cylindrical take-up housing having an upper extent, a lower extent, and a longitudinal slit extending from the upper extent to the lower extent, the take-up housing being coupled to the second upper and lower frame elements such that the lower open portions of the first and second upper frame elements and the upper open portions of the first and second lower frame elements are in communication with the longitudinal slit of the supply housing; an upper cable take-up reel and a lower cable take-up reel positioned within the take-up housing; an axle positioned within, and coaxial with, the take-up housing, the axle serving to join the upper and lower cable take-up reels; a two-way switch coupled to the lower cylindrical take-up housing, the switch serving to rotate the axle in one of two angular directions; a sheet of material having an upper edge, a lower edge, a forward edge and a rearward edge, the forward edge of the sheet of material being secured to the cylindrical roll with a rigid stiffening member sewn into the rearward edge of the sheet of material; an upper cable having a forward end and a rearward end, the upper cable being sewn within the upper edge of the sheet of material, the upper cable being positioned within the first and second upper frame elements, the rearward end of the cable extending beyond the rearward edge of the sheet of material and being coupled to the upper cable take-up reel; a lower cable having a forward end and a rearward end, the lower cable being sewn within the lower edge of the sheet of material, the lower cable being positioned within the first and second lower frame elements, the rearward end of the cable extending beyond the rearward edge of the sheet of material and being coupled to the lower cable take-up reel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved automobile shade which has all the advantages of the prior art automobile shades and none of the disadvantages.

It is another object of the present invention to provide a new and improved automobile shade which may be easily and efficiently manufactured and marketed.

It is a further object of the present invention to provide a new and improved automobile shade which is of a durable and reliable construction.

An even further object of the present invention is to provide a new and improved automobile shade which is susceptible of a low cost of manufacture with regard to both materials and labor, and which accordingly is then susceptible of low prices of sale to the consuming public, thereby making such automobile shades economically available to the buying public.

Still yet another object of the present invention is to provide a new and improved automobile shade which provides in the apparatuses and methods of the prior art some of the advantages thereof, while simultaneously overcoming some of the disadvantages normally associated therewith.

It is therefore an object of the present invention to abate the overheating of the interior cars under the influence of a hot sun.

Yet another object of the present invention is to abate premature aging of automobile interiors caused by the harmful rays of a sun pouring through an unprotected windshield.

Even still another object of the present invention is to comfort drivers and passengers of automobiles by maintaining the temperature at a reasonable level when not in use.

Lastly, it is an object of the present invention to provide a retractable deflector shade comprising an upper horizontal C-shaped frame element having a forward end, a rearward end, an upper closed portion, and a lower open portion, a lower horizontal C-shaped frame element having a forward end, a rearward end, an upper open portion, and a lower closed portion; a vertical cylindrical supply housing having an upper extent, a lower extent, and a longitudinal slit extending from the upper to the lower extent, the supply housing being coupled to the forward ends of the upper and lower frame elements such that the lower open portion of the upper frame element and the upper open portion of the lower frame element are both in communication with the longitudinal slit of the supply housing; a cylindrical roll rotatively received within the supply housing; spring means operatively coupled to the cylindrical roll, the spring means serving to rotate the cylindrical roll to a first angular position; a vertical cylindrical take-up housing having an upper extent, a lower extent, and a longitudinal slit extending from the upper extent to the lower extent, the take-up housing being coupled to the rearward ends of the upper and lower frame elements such that the lower open portion of the upper frame element and the upper open portion of the lower frame element are both in communication with the longitudinal slit of the take-up housing; an upper cable take-up reel positioned within the upper extent of the cylindrical take-up housing; a lower cable take-up reel positioned within the lower extent of the cylindrical take-up housing; a sheet of material having an upper edge, a lower edge, a forward edge and a rearward edge, the forward edge of the sheet of material being secured to the cylindrical roll, the upper edge positioned within the lower open portion of the upper frame element, the lower edge being positioned within the upper open portion of the lower frame element; an upper cable having a forward end and a rearward end, the forward end of the cable being connected to the rearward edge of the sheet of material, the rearward end of the cable being connected to the upper cable take-up reel; a lower cable having a forward end and a rearward end, the forward end of the cable being connected to the rearward edge of the sheet of material, the rearward end of the cable being connected to the lower cable takeup reel.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of an automobile shade constructed in accordance with the principles of the present invention.

FIG. 2 is an enlarged perspective view of one corner of the automobile shade as shown in FIG. 1.

FIG. 5 is a sectional view of a portion of the automobile shade shown in FIG. 1 taken along line 4—4 of FIG. 1.

FIG. 6 is a sectional view taken along line 6—6 of FIG. 5.

DESCRIPTION OF THE PREFERRED EMBODIMENT

Figure 3:
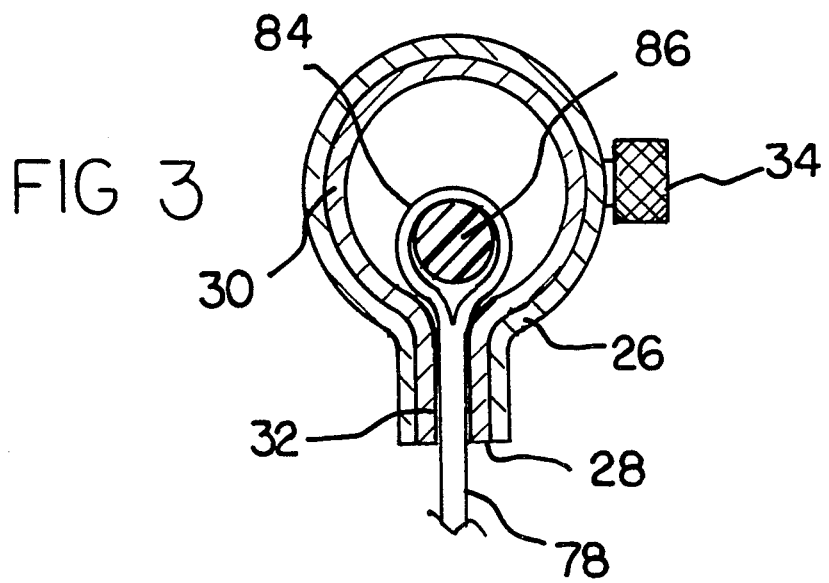
FIG. 3 is a sectional view of a portion of the automobile shade taken along line 3—3 of FIG. 2.
Figure 4:
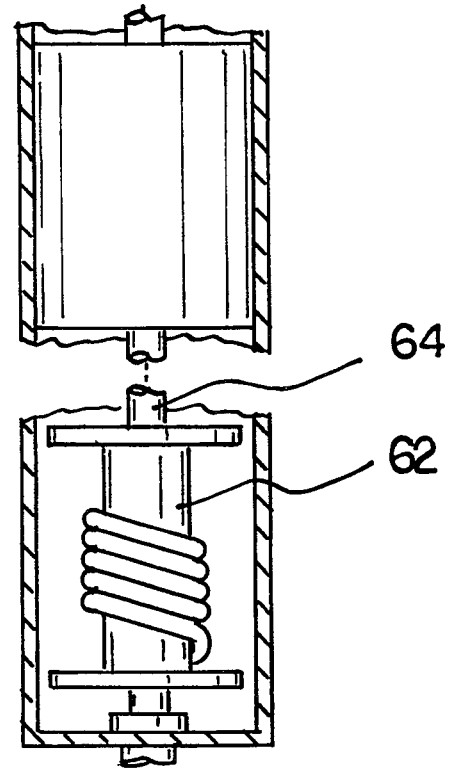
FIG. 4 is a sectional view of a portion of the automobile shade shown in FIG. 1 taken along line 4—4 of FIG. 1.

With reference now to the drawings, and in particular to FIG. 1 thereof, a new and improved retractable deflector shade embodying the principles and concepts of the present invention and generally designated by the reference numeral 10 will be described.

The present invention relates to a retractable sun deflector shade 10 adapted to be secured to the interior of an automotive windshield 12. The shade device includes a rectangular frame 14 which is telescopic in width. The rectangular frame is made up of an upper frame element 16, a lower frame element 18, a cylindrical supply housing 20 and a cylindrical take-up housing 22.

The upper frame element 20 includes a first upper C-shaped frame element 26 having a forward end, a rearward end, an upper closed portion and a lower open portion formed by a slot 28. The upper frame element further includes a second upper C-shaped frame element 30 having a forward end, a rearward end, an upper closed portion, and a lower open portion formed by a slot 32. The forward end of the second upper frame element is telescopically received within the rearward end of the first upper frame element. In order to selectively allow or prevent telescopic movement between the first and second upper frame elements an upper thumb screw 34 is positioned within the rearward end of the first upper frame element 26.

The lower frame element 18 includes a first lower C-shaped frame element having a forward end, a rearward end, an upper open portion, and a lower closed portion formed by a slot 40. The lower frame element is C-shaped in a manner analogous to the C-shaped frame element 26 of the upper frame element 20 as described above, the C-shaped relating to the cross-sectional configuration of such element as can be seen in FIG. 3. The lower frame element further includes a second lower C-shaped frame element 42 having a forward end, a rearward end, an upper open portion, and a lower closed portion formed by a slot 44. The forward end of the second lower frame element. In order to selectively allow or prevent telescopic movement between the first and second lower frame elements a lower thumb screw 34 is positioned within the rearward end of the first lower frame element.

The cylindrical supply housing 20 extends vertically and includes an upper cylindrical supply subhousing having an upper extent, a lower extent, and a longitudinal slit 48 extending from the upper extent to the lower extent. The supply housing is coupled to the first upper frame element such that the lower open portions of the first and second upper frame elements are in communication with the longitudinal slit of the upper cylindrical subhousing. Furthermore, the supply housing is coupled to the first lower frame element such that the upper open portions of the first and second lower frame elements are in communication with the longitudinal slit of the lower cylindrical subhousing.

Positioned within the supply housing 20 is a cylindrical roll 52. The roll has upper and lower mountings 54 which rotatively receive the roll within the housing. Spring 56 are included within the housing which is operatively coupled to the cylindrical roll. The springs serve to rotate the cylindrical roll 52 to a first angular position. Thus, if the cylindrical roll is rotated it will return to its original angular position through the force of the springs.

The cylindrical take-up housing 22 is coupled to the second upper frame element 30 such that the lower open portions of the first and second upper frame elements are in communication with the longitudinal slit of the upper cylindrical housing. Furthermore, the take-up housing 22 is coupled to the second lower frame element 42 such that the upper open portions of the first and second lower frame elements are in communication with the longitudinal slit of the lower cylindrical housing. Positioned within the take-up housing 22 is an upper and a lower take-up reel 60 and 62. The upper cable take-up reel 60 is positioned within the upper cylindrical take-up housing, and the lower cable take-up reel 62 is in similar fashion positioned within the lower cylindrical take-up housing. The upper and lower cable take-up reels are joined by an axle 64. The axle is positioned within, and coaxial with, the take-up housing.

A two-way switch 68 is coupled to the lower cylindrical take-up housing 22. The switch serves to rotate the axle 64 positioned within the take-up housing in one of two angular directions. The switch can be coupled by lines 72 to the automobile fuse box, or alternatively, directly to the automobile battery.

The deflector shade 76 itself is formed from a sheet 78 of material having an upper edge, a lower edge, a forward edge and a rearward edge. The sheet can be formed from cloth, or alternatively, of plastic. Furthermore, indications such as a personalized message or an advertisement may be included upon the surface of the sheet of material. The forward edge 80 of the sheet of material is secured to the cylindrical roll 52 of the supply housing 20. Additionally, a rigid stiffening member can be sewn into the rearward edge of the sheet of material in order to provide additional rigidity.

Sewn within a hem 84 of the upper edge of the sheet of material is an upper cable 86. The upper cable has a forward end and a rearward end. The upper cable is positioned within the first and second upper frame elements. The rearward end of the cable extends beyond the rearward edge of the sheet of material and is coupled to the upper cable take-up reel.

Sewn within a similar hem of the lower edge of the sheet of material is a similar lower cable. The lower cable has a forward end and a rearward end. The lower cable is positioned within the first and second lower frame elements. The rearward end of the cable extends beyond the rearward edge of the sheet of material and is coupled to the lower cable take-up reel.

In use, the frame is secured to the interior of an automotive windshield. The securement can be accomplished by way of suction cups 88 preferably, but adhesives, glues, screws, fasteners, or any other such means that would provide positive securement could be utilized.

The two-way switch 68 is then coupled to the fuse, or automobile battery. Activation of the switch in a first direction rotates the upper and lower take-up reels 60 and 62 which draw the sheet out of the supply housing. The sheet is then in a position to cover the windshield and keep out harmful sunlight and radiation. Activation of the switch in a second direction allows for the rolling up of the sheet by springs 56. When the switch is activated for the second direction, the upper and lower take-up reels provide for a controlled roll up against the force of the spring biased cylindrical roll.

Figure 7:
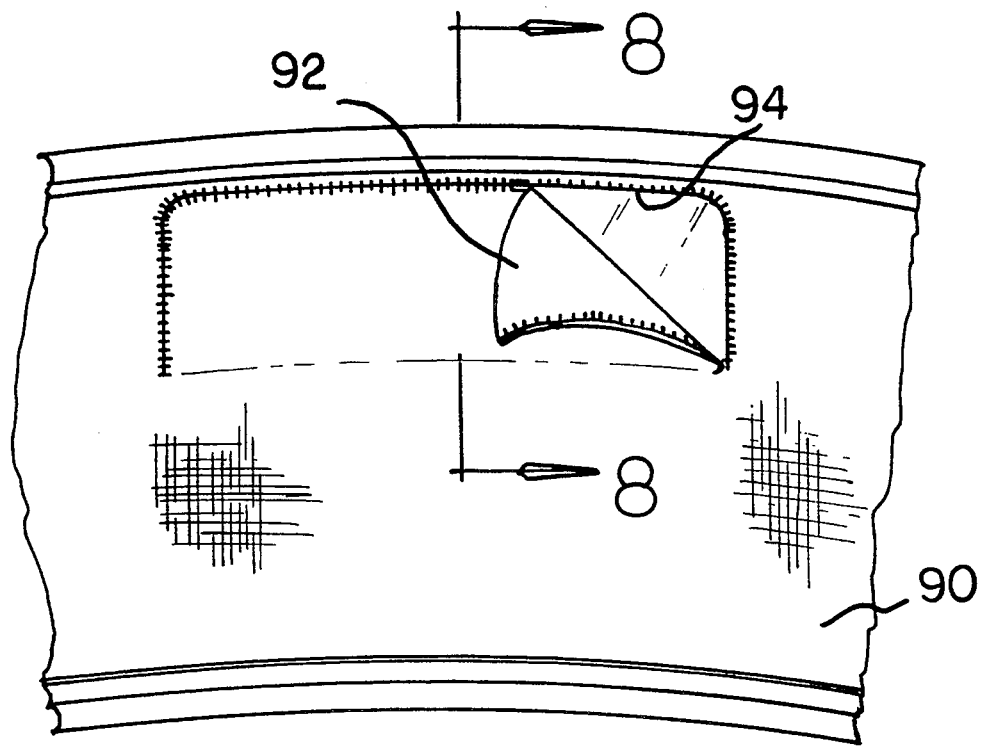
FIG. 7 is a perspective view of a portion of an automobile shade constructed in accordance with an alternate embodiment of the invention.
Figure 8:
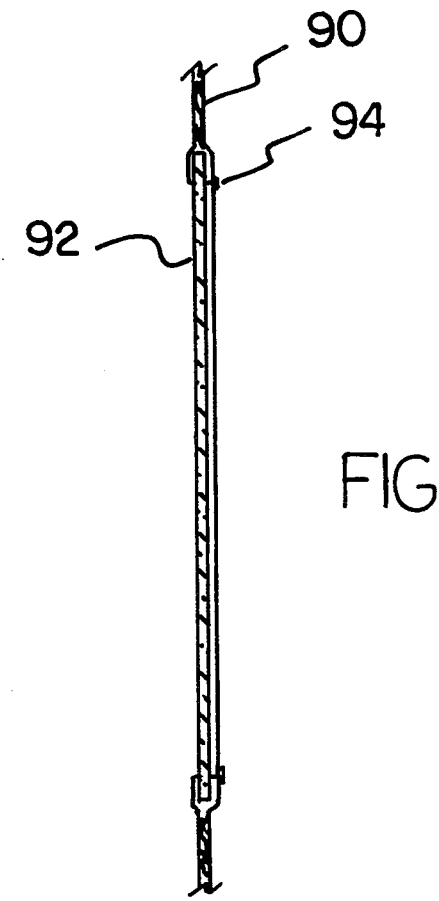
FIG. 8 is a sectional view taken along line 8—8 of FIG. 7.

FIGS. 7 and 8 illustrate an alternate embodiment of the invention according to the embodiment of these Figures, a modified sheet of fabric, whether cloth or plastic is employed. The modified sheet material 90 differs from that of the prior embodiment by having a panel 92 separated from the remainder of the sheet material along the majority of its extent, in an inverted U-shaped configuration according to the preferred embodiment as shown in FIG. 7. The lower edge of the panel remains integrally formed with the remainder of the sheet material.

In association with the inverted U-shaped line of separation is a separable fastener 94, preferable a zipper which may be used by the occupant of the car to open or close the sheet material to allow or preclude viewing when the automobile shade is in the deployed orientation. The zipper may be moved to one end or the other to open or close the panel as desired by the operator. Other releasable fasteners could readily be employed. A pile-type fastener, such as Velcro brand pile-type fastener, has been found to be an acceptable alternative.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A retractable sun deflector shade adapted to be secured to the interior of an automotive windshield, the shade comprising:

a first upper C-shaped frame element having a forward end, a rearward end, an upper closed portion, and a lower open portion and a second upper C-shaped frame element having a forward end, a rearward end, an upper closed portion, and a lower open portion, the forward end of the second upper frame element being telescopically received within the rearward end of the first upper frame element an upper thumb screw positioned within the rearward end of the first upper frame element, the upper thumb screw serving to selectively allow and prevent telescopic movement between the first and second upper frame elements;

a first lower C-shaped frame element having a forward end, a rearward end, an upper open portion, and a lower closed portion and a second lower C-shaped frame element having a forward end, a rearward end, an upper open portion, and a lower closed portion, the forward end of the second lower frame element being telescopically received within the rearward end of the first lower frame element;

a lower thumb screw positioned within the rearward end of the first lower frame element, the lower thumb screw serving to selectively allow and prevent telescopic movement between the first and second lower frame elements;

a cylindrical supply housing having an upper extent, a lower extent, and a longitudinal slit extending from the upper extent to the lower extent, the supply housing being coupled to the first upper and lower frame elements such that the lower open portions of the first and second upper frame elements and the upper open portions of the first and second lower frame elements are in communication with the longitudinal slit of the supply housing;

a cylindrical roll rotatively received within the supply housing with spring means operatively coupled to the cylindrical roll, the spring means serving to rotate the cylindrical roll to a first angular position;

a cylindrical take-up housing having an upper extent, a lower extent, and a longitudinal slit extending from the upper extent to the lower extent, the take-up housing being coupled to the second upper and lower frame elements such that the lower open portions of the first and second upper frame elements and the upper open portions of the first and second lower frame elements are in communication with the longitudinal slit of the supply housing;

an upper cable take-up reel and a lower cable take-up reel positioned within the take-up housing;

an axle positioned within, and coaxial with, the take-up housing, the axle serving to join the upper and lower cable take-up reels;

a two-way switch coupled to the lower cylindrical take-up housing, the switch serving to rotate the axle in one of two angular directions;

a sheet of material having an upper edge, a lower edge, a forward edge and a rearward edge, the forward edge of the sheet of material being secured to the cylindrical roll;

an upper cable having a forward end and a rearward end, the upper cable being sewn within the upper edge of the sheet of material, the upper cable being positioned within the first and second upper frame elements, the rearward end of the cable extending beyond the rearward edge of the sheet of material and being coupled to the upper cable take-up reel;

a lower cable having a forward end and a rearward end, the lower cable being sewn within the lower edge of the sheet of material, the lower cable being positioned within the first and second lower frame elements, the rearward end of the cable extending beyond the rearward edge of the sheet of material and being coupled to the lower cable take-up reel.

2. A retractable deflector shade comprising:

an upper horizontal C-shaped frame element having a forward end, a rearward end, an upper closed portion, and a lower open portion;

a lower horizontal C-shaped frame element having a forward end, a rearward end, an upper open portion, and a lower closed portion;

a vertical cylindrical supply housing having an upper extent, a lower extent, and a longitudinal slit extending from the upper to the lower extent, the supply housing being coupled to the forward ends of the upper and lower frame elements such that the lower open portion of the upper frame element and the upper open portion of the lower frame element are both in communication with the longitudinal slit of the supply housing;

a cylindrical roll rotatively received within the supply housing;

spring means operatively coupled to the cylindrical roll, the spring means serving to rotate the cylindrical roll to a first angular position;

a vertical cylindrical take-up housing having an upper extent, a lower extent, and a longitudinal slit extending from the upper extent to the lower extent, the take-up housing being coupled to the rearward ends of the upper and lower frame elements such that the lower open portion of the upper frame element and the upper open portion of the lower frame element are both in communication with the longitudinal slit of the take-up housing;

an upper cable take-up reel positioned within the upper extent of the cylindrical take-up housing;

a lower cable take-up reel positioned within the lower extent of the cylindrical take-up housing;

a sheet of material having an upper edge, a lower edge, a forward edge and a rearward edge, the forward edge of the sheet of material being secured to the cylindrical roll, the upper edge positioned within the lower open portion of the upper frame element, the lower edge being positioned within the upper open portion of the lower frame element;

an upper cable having a forward end and a rearward end, the forward end of the cable being connected to the rearward edge of the sheet of material, the rearward end of the cable being connected to the upper cable take-up reel;

a lower cable having a forward end and a rearward end, the forward end of the cable being connected to the rearward edge of the sheet of material, the rearward end of the cable being connected to the lower cable take-up reel.

3. The retractable deflector shade as set forth in claim 2 further comprising an axle positioned within, and coaxial with, the take-up housing, the axle serving to join the upper and lower cable take-up reels.

4. The retractable deflector shade as set forth in claim 2 and further comprising a two-way switch coupled to the take-up housing and serving to rotate the axle in one of two angular directions.

5. The retractable deflector shade as set forth in claim 2 wherein the sheet of material is cloth.

6. The retractable deflector shade as set forth in claim 2 wherein: the sheet of material is formed from a plastic.

7. The retractable deflector shade as set forth in claim 2 further comprising a panel secured within the sheet material and a releasable fastener to couple and uncouple the panel with respect to the remainder of the sheet material.

* * * * *